(12) United States Patent
Penrose et al.

(10) Patent No.: US 11,159,459 B2
(45) Date of Patent: Oct. 26, 2021

(54) MANAGING CONTENT IN A COLLABORATION ENVIRONMENT

(71) Applicant: International Business Machines Corporation, Armonk, NY (US)

(72) Inventors: Andrew T. Penrose, Dublin (IE); Jinhui Wang, Dublin (IE); Gary Denner, Leixlip (IE); Jonathan Dunne, Dungarvan (IE)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 16/114,889

(22) Filed: Aug. 28, 2018

(65) Prior Publication Data
US 2020/0076746 A1 Mar. 5, 2020

(51) Int. Cl.
| | | |
|---|---|---|
| G06F 15/16 | (2006.01) | |
| H04L 12/58 | (2006.01) | |
| G06Q 10/10 | (2012.01) | |
| G06N 7/00 | (2006.01) | |
| G06F 40/30 | (2020.01) | |
| G06F 40/211 | (2020.01) | |

(52) U.S. Cl.
CPC ............ H04L 51/04 (2013.01); G06F 40/211 (2020.01); G06F 40/30 (2020.01); G06N 7/005 (2013.01); G06Q 10/107 (2013.01); H04L 51/24 (2013.01)

(58) Field of Classification Search
CPC ........ H04L 51/04; H04L 51/24; G06F 40/211; G06F 40/30; G06N 7/005; G06Q 10/107
USPC ....................................................... 709/206
See application file for complete search history.

(56) References Cited

U.S. PATENT DOCUMENTS

| | | | |
|---|---|---|---|
| 7,480,696 B2 | 1/2009 | Kirkland et al. | |
| 7,673,340 B1* | 3/2010 | Cohen ................. | G06F 11/3438 726/22 |
| 2004/0154022 A1 | 8/2004 | Boss et al. | |
| 2005/0193062 A1* | 9/2005 | Komine ................ | G06Q 10/10 709/204 |

(Continued)

OTHER PUBLICATIONS

Unknown, "How to Mute a User or Group on Facebook Messenger", printed Jul. 5, 2018, 7 pages http://ccm.net/faq/41267-how-to-mute-a-user-or-group-on-facebook-messenger.

(Continued)

*Primary Examiner* — Suraj M Joshi
*Assistant Examiner* — Ayele F Woldemariam
(74) *Attorney, Agent, or Firm* — Grant Johnson

(57) ABSTRACT

Aspects of the present disclosure relate to managing messages within a collaboration environment. A group collaboration channel in which messages are displayed from multiple users is accessed, where the channel includes an application that provides application messages to the channel. A transcript of the channel is analyzed to determine a set of topics a user has discussed. A subset of topics is selected and a user sentiment of each topic is determined. A machine learning classification model is trained based on the selected subset of topics and the user sentiment of each topic. A message is then received from the application. Prior to displaying the message at the channel, a management category for the message is determined based on the classification model. The management category is applied to the message and the display of the message is managed based on the management category.

15 Claims, 10 Drawing Sheets

(56) References Cited

U.S. PATENT DOCUMENTS

| | | | |
|---|---|---|---|
| 2006/0235932 A1 | 10/2006 | Celi, Jr. et al. | |
| 2007/0016641 A1 | 1/2007 | Broomhall | |
| 2007/0203993 A1 | 8/2007 | Cai et al. | |
| 2013/0179515 A1* | 7/2013 | Chi | H04L 29/06401 709/206 |
| 2015/0074020 A1* | 3/2015 | Arpat | G06Q 10/10 706/12 |
| 2016/0380938 A1 | 12/2016 | O'Connor | |
| 2017/0006577 A1 | 1/2017 | Koum et al. | |
| 2017/0134329 A1* | 5/2017 | Edgar | H04L 51/26 |
| 2018/0041456 A1 | 2/2018 | Bastide et al. | |
| 2018/0331842 A1* | 11/2018 | Faulkner | H04L 12/1831 |
| 2018/0367484 A1* | 12/2018 | Rodriguez | G06Q 10/101 |

OTHER PUBLICATIONS

Cabrera, P., "Facebook: What Is Muting a Conversation Mean?", Jun. 17, 8 pages http://www.twelveskip.com/tutorials/facebook/483/facebook-what-is-muting-a-conversation-mean.

SwiftIRC WIKI, "Ban Guide", Muting a user, last modified on Apr. 22, 2014, printed Jul. 5, 2018, 4 pages https://wiki.swiftirc.net/wiki/Ban_guide#Muting_a_user.

Gawas, V., "How do I mute/block an individual contact in WhatsApp group?", Quora, printed Jul. 5, 2018, 2 pages https://www.quora.com/How-do-I-mute-block-an-individual-contact-in-WhatsApp-group.

Mell et al., "The NIST Definition of Cloud Computing", Recommendations of the National Institute of Standards and Technology, Sep. 2011, 7 pages.

* cited by examiner

MANAGING CONTENT IN A COLLABORATION ENVIRONMENT

BACKGROUND

The present disclosure relates generally to the field of collaboration environments, and more particularly, to attenuation or accentuation of messages in a user collaborated environment.

Collaboration tools allow users to create channels for communication (e.g., group messaging). These environments can be beneficial when users are collaborating on projects, documents, code, etc. remotely over a network. In some collaborated environments, applications can be provisioned through the collaborated environment, such that users can execute the applications via the collaborated environment.

SUMMARY

Aspects of the present disclosure relate to managing messages within a collaboration environment. A group collaboration channel in which messages are displayed from multiple users can be accessed, where the channel includes an application that provides application messages to the channel. A transcript of the channel can be analyzed to determine a set of topics a user has discussed. A subset of topics can be selected and a user sentiment of each topic can be determined. A machine learning classification model can be trained based on the selected subset of topics and the user sentiment of each topic. A message can then be received from the application. Prior to displaying the message at the channel, a management category for the message can be determined based on the classification model. The management category can then be applied to the message and the display of the message can be managed based on the management category.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
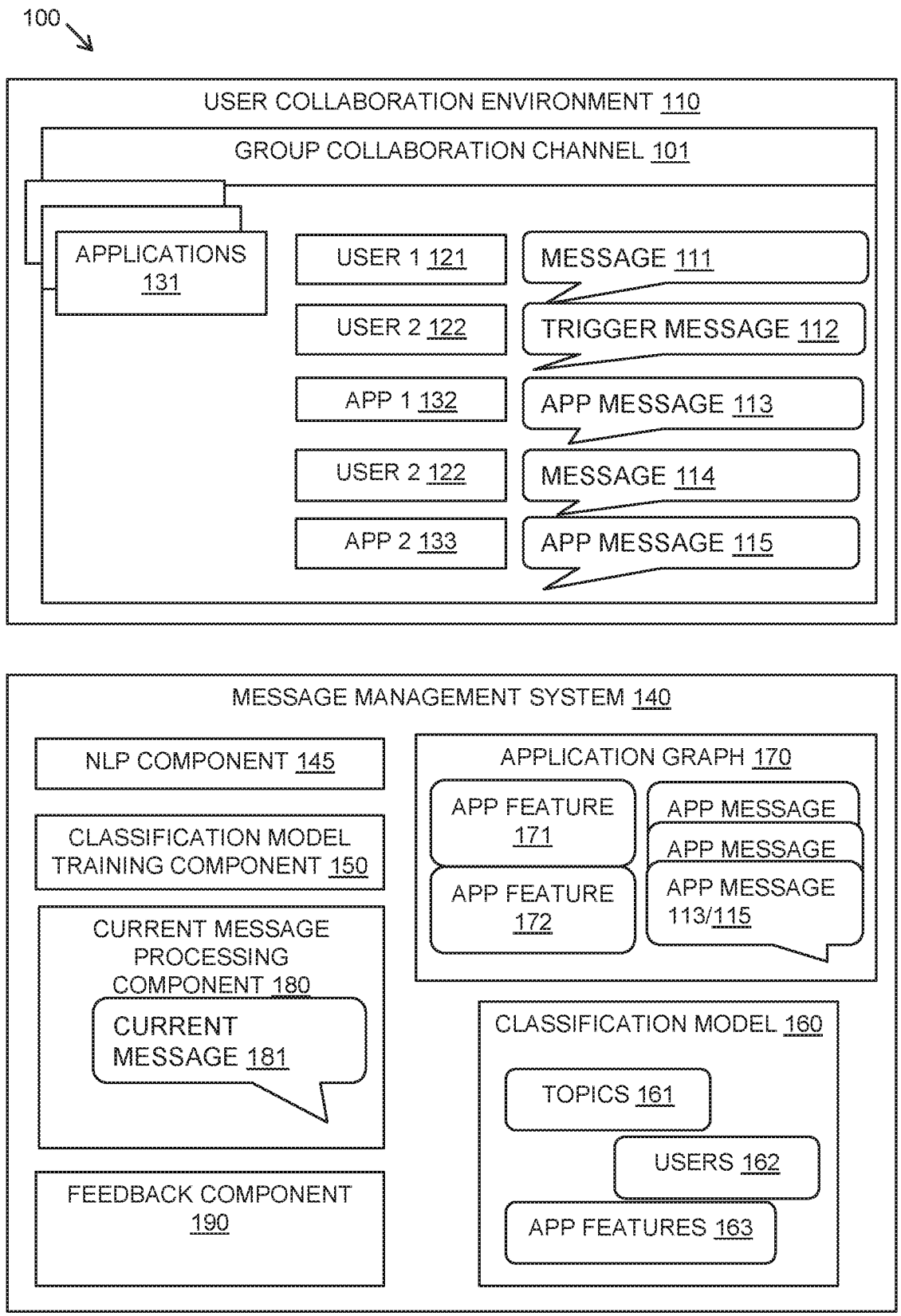
FIG. 1 is a block diagram illustrating a user collaboration environment and a message management system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of collaboration environments, and more particularly, to attenuation or accentuation of messages in a user collaborated environment. While the present disclosure is not necessarily limited to such applications, various aspects of the disclosure may be appreciated through a discussion of various examples using this context.

Collaboration tools allow users to create channels where communication can take place (e.g., group messaging). Various applications can be added to these communication channels. The domain of the channel may well be suited for the applications that have been added (which can be added by anyone in that channel), but the information coming from the applications (e.g., usage information) may not be of interest to all users in this channel. In a collaborative environment, the ability to intelligently filter data for a user is just as important as providing the user with the right information.

Aspects of the present disclosure relate to attenuation or accentuation of messages in a group collaboration channel in which messages are received from users and one or more applications that are included in the channel.

The term group collaboration channel is used to refer to a channel, workspace, or group chat in which multiple users may participate and in which messages are displayed in a user interface to collaborating users. The group collaboration channel can also include one or more applications which can be integrated or added as extension applications allowing messages and content from application sources. The group collaboration channel can be one of multiple channels in a user collaboration environment or tool.

Embodiments are configured to cognitively suppress (e.g., filter, attenuate, mute, deemphasize, hide, erase, block, etc.) or emphasize (e.g., provide, accentuate, notify, present, alarm, embolden, etc.) application messages in conversations in a group collaboration channel by training a model to determine, based on various inputs to the model, if application content in a channel should be attenuated (e.g., suppressed) or accentuated (e.g., emphasized) for a particular user.

The model can be trained using the transcript of the messages in the channel to analyze content topic (e.g., via natural language processing), utilize user information and feedback that can be inferred or positively provided, and use an application graph of the applications and their features integrated in the channel.

Embodiments leverage the transcript of the messages in the channel (e.g., users' interactions with other users or applications in the channel) to train a model that is used to classify users to attenuate or accentuate application data in the channel for those users. Ongoing conversations, including topic and message cadence, can be evaluated within the channel (e.g., using natural language processing) and user information can be derived within the context of the ongoing conversation.

A user interface can be employed with an indication of attenuated messages to allow the user to view the suppression and provide feedback to the learning algorithm. Feedback can also be suggested to the learning algorithm to accentuate a message.

Referring now to the figures, FIG. 1 is a schematic diagram 100 illustrating a user collaboration environment 110 and a message management system 140, in accordance with embodiments of the present disclosure.

A group collaboration channel 101 can be provided, for example by the user collaborative environment 110 (or another tool), providing content including messages 111, 112, 114 from a first user 121 and a second user 122 and application messages 113 and 115 from one or more applications 131 that are coupled to the channel 101. The messages 111-115 are displayed to the users via client displays of the group collaboration channel 101. The user messages displayed in the channel 101 can include a trigger message 112 that triggers a first application 132 or a second application 133.

The described system provides a message management system 140 for adjusting the message content that is displayed for a user. A message can be attenuated by muting and/or hiding a message and/or providing a notification of a hidden message. A message can be accentuated by highlighting or flagging the message as important.

The message management system 140 can include a natural language processing (NLP) component 145 configured to receive and analyze unstructured text from chat transcripts (e.g., to determine topics of discussion and/or sentiments of users). The message management system 140 can further include a classification model training component 150 configured to train a machine learning classification model 160 for the group collaboration channel 101. The classification model 160 can include features relating to message topics 161 (e.g., sports, video games, science fiction, astronomy), user information 162 (e.g., age, preferences, username, etc.), and application features 163 (e.g., data usage, user data, notifications, updates, etc.).

The message management system 140 can provide an application graph 170 of features 171, 172 (individually a first feature 171 and a second feature 172) of applications 131 providing messages 113, 115 to the group collaboration channel 101. For example, the application graph 170 can be generated from the first application 132 and second application 133 in the group collaboration channel 101. The application graph 170 can be created before any messages are associated with it and, as messages occur, associations can be made regarding features in the application that trigger the messages to be displayed.

The message management system 140 can include a current message processing component 180 configured to process a current message 181 arriving in the group collaboration channel 101 to determine, using the classification model 160, if content arising from an application feature triggered by the current message 181 should be attenuated or accentuated (e.g., managed) when displayed for specific users in the group collaboration channel 101.

The message management system 140 can include a feedback component 190 of the user information in the group collaboration channel 101 for further training of the classification model 160.

Figure 2A:
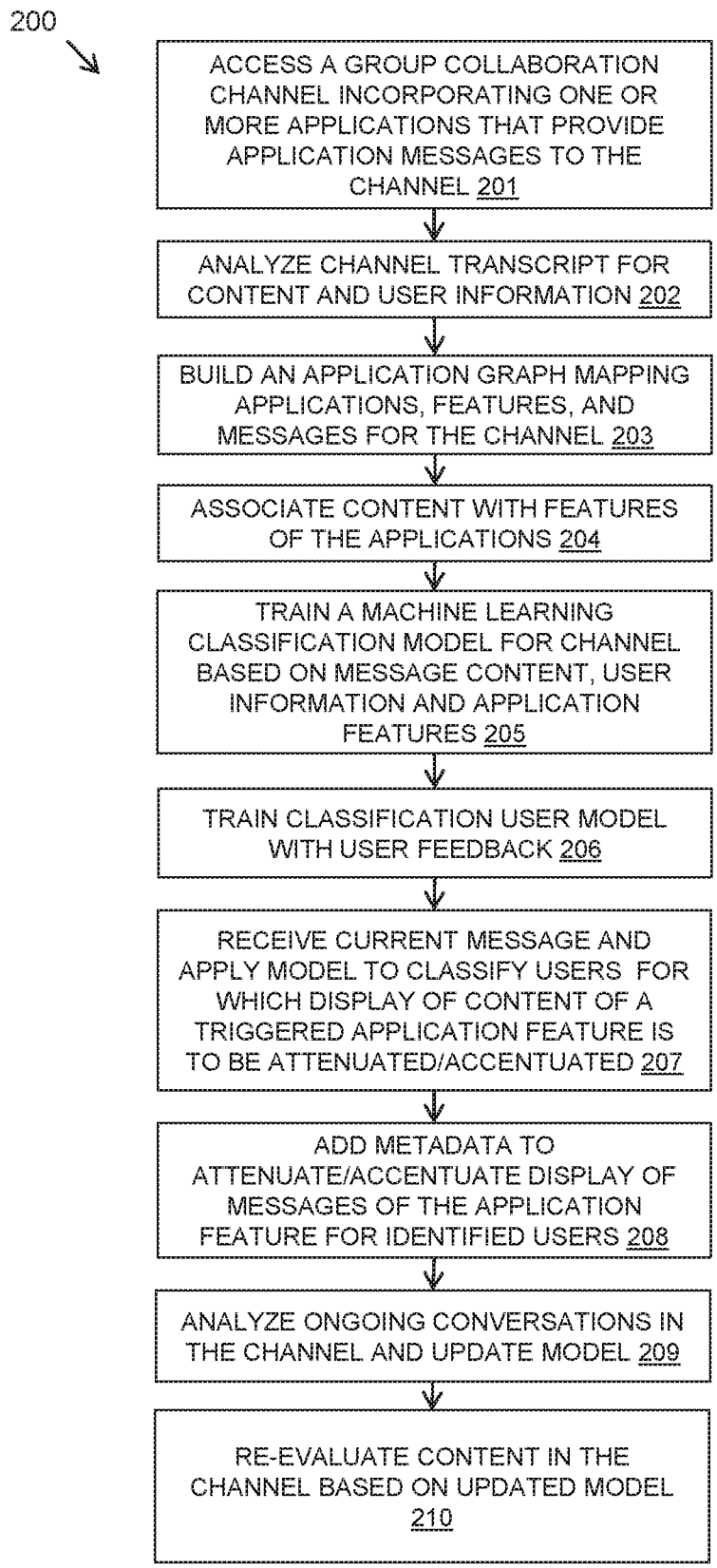
FIG. 2A is a flow diagram illustrating an example method for managing messages in a collaboration environment based on a machine learning classification model, in accordance with embodiments of the present disclosure.

Referring to FIG. 2A, shown is a flow-diagram illustrating a method 200 for managing a collaborative environment, in accordance with embodiments of the present disclosure.

The method 200 can initiate where a group collaboration channel incorporating one or more applications that provide application messages to the channel is accessed. This is illustrated at operation 201. The channel incorporates one or more applications including extension applications or integration applications that provide application messages to the channel from application sources.

A transcript of the channel messages can then be analyzed for characteristics such as topics, cadence, user information, sentiment regarding particular topics, etc. This is illustrated at operation 202. In embodiments, analyzing the transcript of channel messages can be completed via natural language processing techniques (see FIG. 3 for more detail). For example, an NLP module can be configured to derive topics/sentiments from users communicating within a collaborative environment. The discourse in the group collaboration channel over time can be analyzed to build a model. For example, the analysis may aid in understanding topics or important discussions in the channel (e.g., topics a user is interested in or has interacted with). The analyzation can be based on the entire history of the chat collaboration within the group collaboration channel. In some embodiments, sentiments associated with specific topics can be obtained for message management purposes. For example, if a particular user has a negative sentiment (e.g., angry) when talking about the topic "football," the topic "football" can be attenuated in the future.

An application graph of the one or more applications incorporated in the channel is then built (e.g., generated). This is illustrated at operation 203. The application graph maps an application to application features and messages triggering the features. Each application publishes its features and purpose to the application graph for the channel in order to determine which message(s) were used to trigger the application in the channel.

As applications are used in the channel, the data related to the messages and the analysis of the messages can be used to associate different content with each of the features of an application. This is illustrated at operation 204.

A machine learning classification model for the group collaboration channel can then be trained from a set of input features. This is illustrated at operation 205. The set of input features can include: message content including topic, cadence, and sentiment as obtained from the analysis (e.g., NLP analysis) of the channel transcript; user information from the analysis of the channel transcript and from user feedback; and features of the applications incorporated into the channel as provided by the application graph. The output of the model can be a classification for a user regarding whether message content (as part of the input feature to the model and contents arising from the triggered application feature) is to be attenuated or accentuated (i.e., managed) when displayed to the user.

The machine learning classification model is trained using the analysis of the channel transcript and the application graph that is built for the channel.

The machine learning classification model can then be trained with user information including inferred user information from analysis of the group collaboration channel and/or user feedback. This is illustrated at operation 206.

A current application message that is to be input to the channel and applied to the machine learning classification model to classify users for which display of content arising from a triggered application feature is to be attenuated or accentuated can then be received. This is illustrated at operation 207. The current message content can be analyzed using keyword analysis (e.g., NLP analysis) and mapping to topics in the machine learning classification model. The model can be generated for each user to classify each respective user for a current message.

The content of messages can trigger features in applications which can process message content and automatically post messages to channels for users. The model output dictates whether a user should see content from a particular application or not, and whether the content should be attenuated or accentuated.

The model can evaluate data about the applications to be attenuated/accentuated, topics users are involved in, keywords for respective messages, entities and topics that respective messages relate to, and user feedback relating to applications triggered by messages.

Metadata can then be added to a message to attenuate or accentuate the display of the message for a particular user. This is illustrated at operation 208. This can include providing messages with user identifiers (e.g., tagged as metadata on the message) to indicate users for which the messages are to be attenuated or accentuated and a category of attenuation or accentuation to be applied. For example, when a message is not to be shown for one or more users, the message will have a list of user identifiers that it should not display for.

Ongoing conversations (e.g., as one or more current messages) can then be analyzed to update the classification model. This is illustrated at operation 209. For example, user information relating to topics users are interested in can be analyzed such that the classification model is updated. This can alter the manner in which future messages are managed (e.g., attenuated or accentuated) for particular users.

The content in the channel can then be reevaluated with respect to the updated model to determine whether any changes are required for past messages. This is illustrated at operation 210. For example, based on the updated model, a message which was previously not attenuated for a particular user can be attenuated (e.g., based on analysis of the messages). As well as the runtime nature of the implementation (e.g., evaluating current messages with respect to a classification model), there can be a process by which all content in the channel (e.g., the transcript history) is revisited after updating the classification model. The user can then be presented with content that they were not previously interested in. Alternatively, content that a user was interested may not be blocked or hidden based on the updated model.

A classification model built from various inputs and user feedback can be configured to dictate user preferences for particular users regarding the management (e.g., blocking, accentuating, attenuating, alerting, etc.) of messages (e.g., received from other users or applications) in a collaborative channel.

Further details of aspects of the present disclosure are now provided. A machine learning classification model is trained for a group collaboration channel in which messages are received from one or more applications.

Topic modeling can be carried out on the content of the channel. In embodiments, burst and reflection analysis can be completed to identify and create a topic model for a particular collaboration channel.

Table 1 below depicts bursts/reflections in a channel with topic analysis for each. A burst occurs when messages are posted to a channel with an inter-arrival time within a period "X" (for example, 10 min, 20 min etc.). When messages arrive in the channel outside of the inter-arrival time period X (i.e. they are more intermittent) then they become part of a reflection.

TABLE 1

| Time Stamps of Messages Posted in Channel (seconds) | Burst/ Reflection | Topic |
| --- | --- | --- |
| 1135-1234 | Burst | Tennis |
| 1322-1410 | Burst | Soccer |
| 1450-1540 | Reflection | Annual Leave |
| 1700-1715 | Burst | Work project X |
| 1900-2103 | Reflection | Github |
| 2140-2200 | Burst | Coffee |
| 2240-2250 | Burst | Weather |
| 2327-2340 | Burst | School |

As shown above based on the time stamps of messages posted in the channel, a burst or reflection classification is assigned to messages within the topic/time period. In this example, the set time period "X" can be defined as 100 seconds, such that if any topic (e.g., annual leave) is discussed for longer than 100 seconds, a reflection classification is assigned to the messages included in the topic. The time period "X" can be any suitable time period and can be fine-tuned based on classification and message management goals. The burst/reflection classifications can be used to determine whether corresponding messages should be reflected (e.g., selected) when training the machine learning classification model. For example, burst messages may not be considered when generating the classification model, as they can be too sporadic, intermittent, etc. to be considered as a representation for a particular user's interests (e.g., if a user only mentions soccer in a few messages, classifying soccer as a topic of interest for the user may not be an accurate representation of the user's actual interests).

Reference is now made to Table 2 depicting an application graph. An application graph in a channel shows features available in each application and actions that each feature executes within the channel. The application graph identifies messages that trigger applications automatically via commands. The graph is built to map the feature involved in the application with the message that triggered it.

TABLE 2

| App | Feature | Action | Message |
| --- | --- | --- | --- |
| App 1 | Feature 11 | Update | Message 1 |
| | Feature 12 | View | Message 5, Message 10 |
| | Feature 13 | Create | Message 7 |
| App 2 | Feature 21 | Pull of Data | Message 39 |
| | Feature 22 | Push of Data | Message 20, Message 37 |

As depicted in Table 2, a first application (e.g., App 1) and a second application (e.g., App 2) include various features linked to particular actions. Messages that trigger the particular actions (e.g., the display of Message 1 triggers an Update Action) are mapped in Table 2, and can be used for the purposes of managing messages within the collaboration environment. For example, based on metadata associated with messages (e.g., Message 7), a determination can be made that the particular feature or action is not important (and thus should be attenuated) for a particular user.

The classification model can be created from annotated data from users and/or inferred user information from user data messages in the channel, topics the user is involved in, etc.

Inferred user information can include one or more of: application data, topics a user is involved in, messages posted by a user, positive and negative comments made by a user to other messages (e.g., determined via sentiment analysis). In some embodiments, a sentiment score can be generated for particular topics, and message management (attenuation vs. accentuation) can be completed based on the sentiment score for particular topics. For example, assume a sentiment score scale ranges from 0-100 for a topic "cooking." In this example, if a user has a sentiment score from 0-50, the sentiment score can indicate that this user is not fond of cooking, and therefore messages relating to cooking should be attenuated. Alternatively, if the user has a sentiment score from 51-100, the sentiment score can indicate that this user is interested in cooking and therefore messages relating to cooking should be accentuated.

A user interface associated with the group collaboration channel can be provided for indicating attenuated messages to the user and configured to provide user feedback on attenuated messages. Annotated data from users can include: positive or negative comments from the user, annotation dropdown on a message that lets them add relevancy. In this regard, the automatic management of messages can be in control of the user, allowing the user to accept or deny potential management outcomes.

The following data can be obtained and stored from a user: application data, topics of interest, messages posted by users and key themes, entity and topic analysis on the messages, whether the user negatively/positively commented on the data coming from an application.

As applications are used in the channel, the data related to the messages and the analysis of the messages can be used to associate different content with each of the features of an application. This can be done from keyword analysis (e.g., natural language processing, see FIG. 3) along with time sensitive analysis (e.g., burst/reflection analysis).

Based on the data, inputs are provided to create the machine learning classification model that enables classification of users based on whether data from an application should be attenuated or accentuated.

The machine learning classification model can be implemented using a neural network, using logistic regression, or other machine learning processes. For more information relating to generating a neural network classification model, see FIG. 4

Machine learning is a field of computer science that uses statistical techniques to give computer systems the ability to "learn" with data, without being explicitly programmed. The learning progressively improves performance on a specific task. The learning can use training sets of data to infer models.

Within machine learning, neural networks are algorithms built around a model of artificial neurons spread across three or more layers that provide levels of abstraction. An input layer consists of neurons that receive the data and pass it on and the number of neurons in the input layer is equal to a number of features in the data set. An output layer consists of a number of nodes for each type of classification to be applied. In between the input and output layers are hidden layers. Hidden layers consist of a number of neurons that apply transformation to the input before passing them on. As the network is trained, the nodes that are found to be more predictive of the outcome are weighted more heavily. The number of different layers can vary for different group collaboration channels.

In statistics, a logistic model is a statistical model with an independent variable input, a continuous variable, a dependent variable output, a binary variable, where a unit change in the input multiplies the odds of the two possible outputs by a constant factor. In regression analysis, logistic regression is estimating the parameters of a logistic model. The two possible output values are often labeled as "0" and "1", which can represent outcomes such as attenuate/do not attenuate.

Once a classification model has been created based on the input features, a user interaction can be supplied in the form of an incoming message to be run against the model. Messages can then be attenuated or accentuated for a user based on the model. The model can output a classification of the user related to an application. The classification of the user can be an attenuation/accentuation category for messages from the application.

Aspects can execute suggestive changes based on behavior or time, such that a prior action is reevaluated based on further data from the classification model to suggest a topic or application may now be of interest based on what is occurring at that point in time. Instead of the runtime nature of the implementation, content in the channel can be revisited after training of the classification model has occurred over time. A user can be presented with suggested content they might not have been previously interested in or content that was blocked, that they might want to listen to now.

The method can feedback information on users who have content attenuated, so that users who expect responses from those who have attenuated content are aware that the attenuated users may not have seen their content.

Users can also get suggestions whether to attenuate content based on the topics being discussed relative to their interests. For example, if a user is working on a type of database model and all the topics refer to a different type of database model, then suggestions are made to attenuate until a "relevant" topic is being discussed.

The described method and system provide the feature of utilizing natural language processing in addition to a machine learning model to analyze the ongoing conversations (topic, and message cadence) within the group collaboration channel and derive the user information within the context of the ongoing conversation. The described method and system selectively attenuates or accentuates content for users based on content topic and user information.

Chat or messaging discourse is analyzed (e.g., using natural language processing techniques) and a set of features is collected (i.e. users, topic, and message cadence). Using the analyzed features, a machine learning classification model in the form of a selective muting model is derived. The model is used to arbitrate which discourse is muted until feedback is processed so that the learning model is altered and determines that loudening the message for the user is appropriate.

The model can be incorporated into a wider learning model to improve message attenuation (including message muting) or accentuation precision.

Figure 2B:
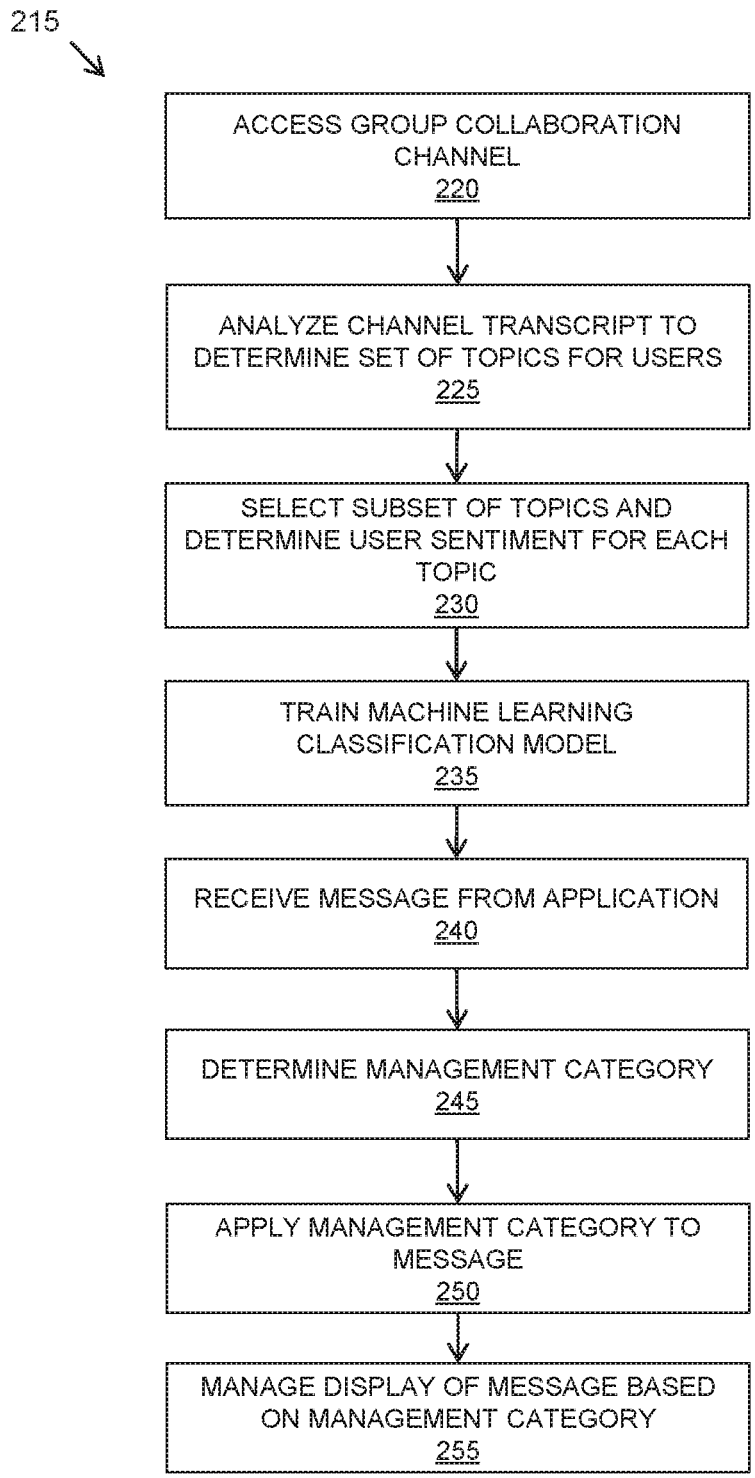
FIG. 2B is a flow diagram illustrating another example method for managing messages in a collaborative environment, in accordance with embodiments of the present disclosure.

Referring now to FIG. 2B, shown is a flow diagram illustrating another example method 215 for managing messages within a collaborative environment, in accordance with embodiments of the present disclosure.

Method 215 initiates where a group collaboration channel is accessed. This is illustrated at operation 220. The group collaboration channel can include various components such as chat windows, subtopic threads, applications (e.g., integrated within the channel), etc. In embodiments, the applications can be configured to transmit messages to the group collaboration channel. The messages can be transmitted based on triggers (e.g., message inputs, action executions (e.g., clicking a "button"), updates, etc.). The group collaboration channel can include a transcript of message history. The transcript can include user identifiers, time stamps, indications of application messages, and indications of application actions (e.g., "update complete").

The transcript for the group collaboration channel is then analyzed to determine a set of topics. This is illustrated at operation 225. The set of topics can be a clean, organized, list of topics. In embodiments, the set of topics can be associated with particular users. For example, a first user can have a topic list: A, B, D, and F, while a second user can have a topic list: A, C, E, and G. The set of topics can be determined based on analysis via a natural language processor. Further discussion regarding the natural language processor is discussed with reference to FIG. 3.

A subset of topics of the set of topics is then selected for a particular user. Further, a user sentiment is determined for each selected topic. This is illustrated at operation 230. In embodiments, the subset of topics is determined using burst/reflection analysis described above. For example, topics which are sporadically/intermittently (e.g., burst topics) discussed may not be selected, and only topics which have substantial discussion may be selected.

In embodiments, determining a sentiment score for each topic is determined by a natural language processor configured to determine sentiment associated with particular topics. Further detail regarding determining a sentiment of a particular topic is discussed with reference to FIG. 3. In some embodiments, topic sentiment can be determined by generating a sentiment score for a particular topic and comparing the sentiment score to a sentiment threshold. In embodiments, in response to exceeding the sentiment threshold, a positive sentiment (e.g., happy, interested, ecstatic, etc.) is determined. Similarly, in response to falling below (e.g., not meeting or exceeding) the sentiment threshold, a negative sentiment (e.g., sad, uninterested, annoyed, etc.) is determined. For example, assume a sentiment score range spans from 1-100, with a sentiment threshold being 70. If a sentiment score for a topic "marathon" is determined to be 78, then a positive sentiment can be determined, as the sentiment score of 78 exceeds the sentiment threshold 70. The sentiments are used to determine whether particular topics should be accentuated or attenuated for particular users. The sentiment determinations can be provided to the machine learning classification model, such that message management can be completed based on the sentiment scores.

A machine learning classification model is then generated based on the subset of topics and sentiment for each topic. This is illustrated at operation 235. Generating a machine learning classification model can be completed by inputting topics and corresponding sentiment scores into a machine learning classification model. The model can then be used to dictate future message management. In embodiments, the machine learning classification model can be generated using a neural network, logistic regression, or any other suitable machine learning technique. Further discussion regarding generation of a neural network is discussed with reference to FIG. 4.

A message is then received from an application (e.g., an application source, a feature of an application, an action of an application, etc.). This is illustrated at operation 240. Prior to displaying the message, a management category is determined for a user based on the user's machine learning classification model generated at operation 235. This is illustrated at operation 245. The management category can include attenuation, accentuation, notifications, feedback requests, and "nothing" (e.g., no action). For example, if a sport application is attempting to display a message in the collaboration channel, and a particular user has a low sentiment score regarding the topic "sports," then the message transmitted by the sports application can be attenuated for the user (e.g., deemphasized, hidden, etc.).

The management category is then applied to the message for the user. This is illustrated at operation 250. Applying the management category can include tagging the message from the application with metadata indicating the management category for the user. The metadata can then be analyzed for the user (prior to displaying the message) such that a proper message management action can be executed. For example, assume a user has a positive sentiment score regarding the topic "cooking." If a message from a cooking application is attempted to be displayed in the collaborative environment, metadata indicating that the message should be accentuated for the user can be tagged onto the message such that the message is emphasized to the user.

The display of the message from the application is then managed based on the applied management category for the user. This is illustrated at operation 255. The display of the message can then be attenuated (e.g., hidden, deemphasized, etc.), accentuated (e.g., emphasized, emboldened, flagged, etc.), or neither (e.g., no action is completed for that user).

Figure 3:
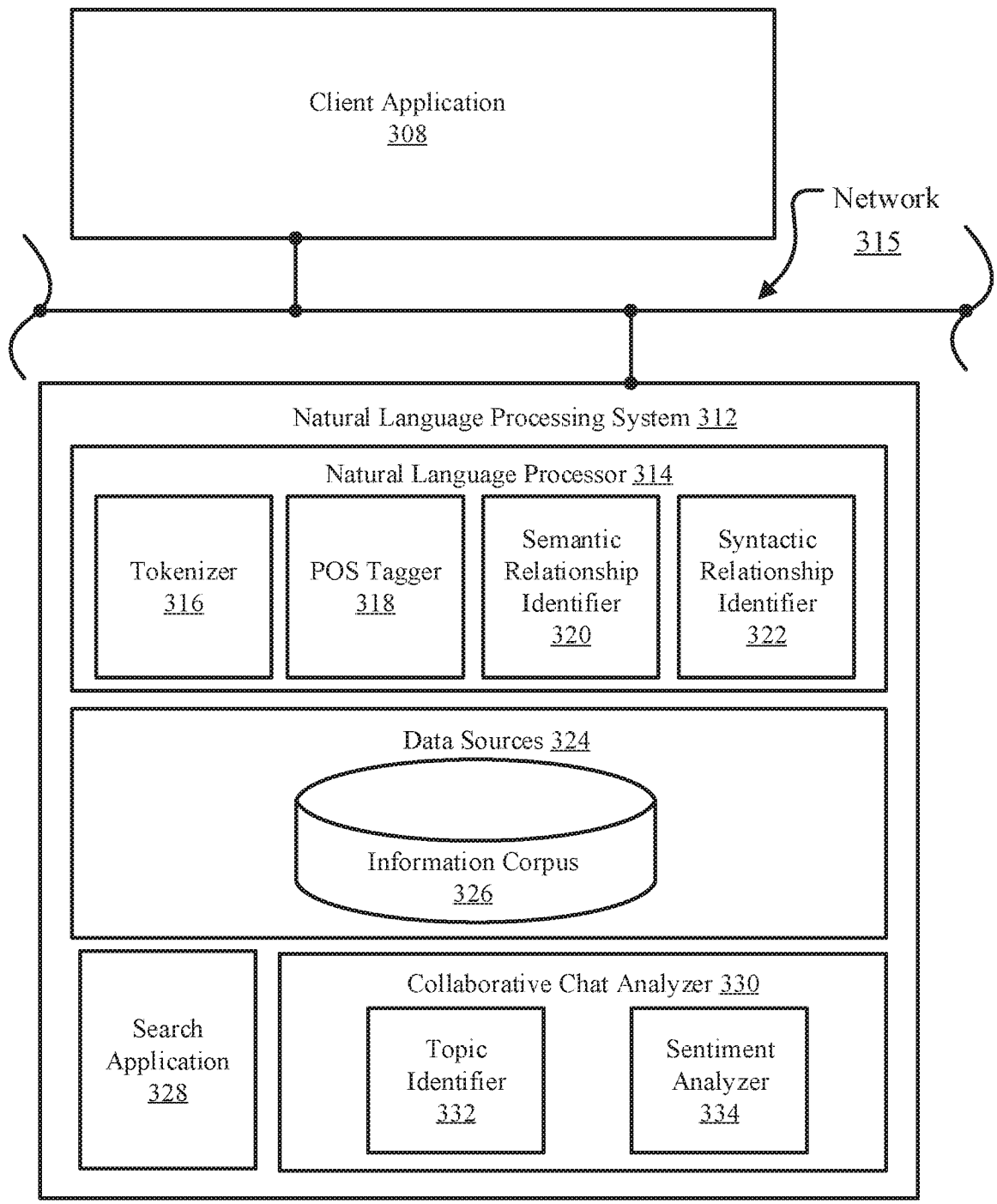
FIG. 3 illustrates a block diagram of an example natural language processing system configured to analyze textual inputs, in accordance with embodiments of the present disclosure.

Turning now to FIG. 3, illustrated is a block diagram of an example natural language processing system configured to analyze text in a collaborative environment transcript, in accordance with embodiments of the present disclosure. In some embodiments, a user collaboration environment (such as the user collaboration environment 110 of FIG. 1) or a collaborative chat analyzer 330 can receive text data of collaborated conversations and transmit them in the form of unstructured textual documents/transcripts (e.g., "electronic documents") to be analyzed by the natural language processing system 312 which can be a standalone device, or part of a larger computer system. Such a natural language processing system 312 can include a client application 308, which can itself involve one or more entities operable to generate or modify information in the unstructured textual document(s) (e.g., analog or electronic textual compositional artifacts) that is then dispatched to a natural language processing system 312 via a network 315.

Consistent with various embodiments, the natural language processing system 312 can respond to electronic document submissions sent by a client application 308 (e.g., a collaboration environment 110). Specifically, the natural language processing system 312 can analyze a received unstructured textual document to identify one or more conversation topics and/or terms reflecting emotional reactions/sentiments (e.g., positive and/or negative reactions) associated with the conversation topic(s). In some embodiments, the natural language processing system 312 can include a natural language processor 314, data sources 324, a search application 328, and a collaborative chat analyzer 330. The natural language processor 314 can be a computer module that analyzes the received unstructured textual conversation transcript(s) and other electronic documents. The natural language processor 314 can perform various methods and techniques for analyzing electronic documents (e.g., syntactic analysis, semantic analysis, etc.). The natural language processor 314 can be configured to recognize and analyze any number of natural languages. In some embodiments, the natural language processor 314 can parse passages of the documents. Further, the natural language processor 314 can include various modules to perform analyses of electronic documents. These modules can include, but are not limited to, a tokenizer 316, a part-of-speech (POS) tagger 318, a semantic relationship identifier 320, and a syntactic relationship identifier 322.

In some embodiments, the tokenizer 316 can be a computer module that performs lexical analysis. The tokenizer 316 can convert a sequence of characters into a sequence of tokens. A token can be a string of characters included in an electronic document and categorized as a meaningful symbol. Further, in some embodiments, the tokenizer 316 can identify word boundaries in an electronic document and break any text passages within the document into their component text elements, such as words, multiword tokens, numbers, and punctuation marks. In some embodiments, the tokenizer 316 can receive a string of characters, identify the lexemes in the string, and categorize them into tokens.

Consistent with various embodiments, the POS tagger 318 can be a computer module that marks up a word in passages to correspond to a particular part of speech. The POS tagger 318 can read a passage or other text in natural language and assign a part of speech to each word or other token. The POS tagger 318 can determine the part of speech to which a word (or other text element) corresponds, based on the definition of the word and the context of the word. The context of a word can be based on its relationship with adjacent and related words in a phrase, sentence, or paragraph. In some embodiments, the context of a word can be dependent on one or more previously analyzed electronic documents (e.g., the content of one formula can shed light on the meaning of text elements in another formula). In embodiments, the output of the natural language processing system 312 can populate a text index, a triplestore, or a relational database to enhance the contextual interpretation of a word or term. Examples of parts of speech that can be assigned to words include, but are not limited to, nouns, verbs, adjectives, adverbs, and the like. Examples of other part of speech categories that POS tagger 318 can assign include, but are not limited to, comparative or superlative adverbs, wh-adverbs, conjunctions, determiners, negative particles, possessive markers, prepositions, wh-pronouns, and the like. In some embodiments, the POS tagger 318 can tag or otherwise annotate tokens of a passage with part of speech categories. In some embodiments, the POS tagger 318 can tag tokens or words of a passage to be parsed by the natural language processing system 312.

In some embodiments, the semantic relationship identifier 320 can be a computer module that can be configured to identify semantic relationships of recognized text elements (e.g., words, phrases) in documents. In some embodiments, the semantic relationship identifier 320 can determine functional dependencies between entities and other semantic relationships.

Consistent with various embodiments, the syntactic relationship identifier 322 can be a computer module that can be configured to identify syntactic relationships in a passage composed of tokens. The syntactic relationship identifier 322 can determine the grammatical structure of sentences such as, for example, which groups of words are associated as phrases and which word is the subject or object of a verb. The syntactic relationship identifier 322 can conform to formal grammar.

In some embodiments, the natural language processor 314 can be a computer module that can parse a document and generate corresponding data structures for one or more portions of the document. For example, in response to receiving an unstructured textual report at the natural language processing system 312, the natural language processor 314 can output parsed text elements from the report as data structures. In some embodiments, a parsed text element can be represented in the form of a parse tree or other graph structure. To generate the parsed text element, the natural language processor 314 can trigger computer modules 316-322.

In some embodiments, the output of natural language processor 314 can be used by search application 328 to perform a search of a set of (e.g., one or more) corpora to retrieve information regarding conversation topics and/or emotional sentiments. As used herein, a corpus can refer to one or more data sources. In some embodiments, the data sources 324 can include data warehouses, information corpora, data models, and document repositories. In some embodiments, the data sources 324 can include an information corpus 326. The information corpus 326 can enable data storage and retrieval. In some embodiments, the information corpus 326 can be a storage mechanism that houses a standardized, consistent, clean, and integrated list of conversation topics and/or emotional sentiments. The information corpus 326 can also store, for each topic/sentiment, a list of associated outcomes, by user. For example, the information corpus 326 can include a ranking of conversational topics for each encountered user, and/or a user profile for each encountered user. The data can be sourced from various operational systems. Data stored in the information corpus 326 can be structured in a way to specifically address reporting and analytic requirements. In some embodiments, the information corpus 326 can be a data repository, a relational database, triplestore, or text index.

In some embodiments, the collaborative chat analyzer 330 can be a computer module that identifies conversational topics and user sentiments associated with those topics. In some embodiments, the collaborative chat analyzer 330 can include a topic identifier 332 and a sentiment analyzer 334. When an unstructured textual document is received by the natural language processing system 312, the collaborative chat analyzer 330 can be configured to analyze the document using natural language processing to identify one or more conversational topics. The collaborative chat analyzer 330 can first parse the conversation using the natural language processor 314 and related subcomponents 316-322. After parsing the conversation, the topic identifier 332 can identify one or more topics present in the conversation. This can be done, for example, by searching a dictionary (e.g., information corpus 326) using the search application 328.

The sentiment analyzer 334 can determine the sentiment a user exhibits for a given conversational topic identified by topic identifier 332. This can be done by using the search application 328 to traverse the various data sources (e.g., the information corpus 326) for information regarding a visitor's reaction to displayed content. The sentiment analyzer 334 can search, using natural language processing, documents from the various data sources for terms related to those detected in the conversation and/or user's reaction (e.g., using relational databases, thesauruses, etc.).

Figure 4:
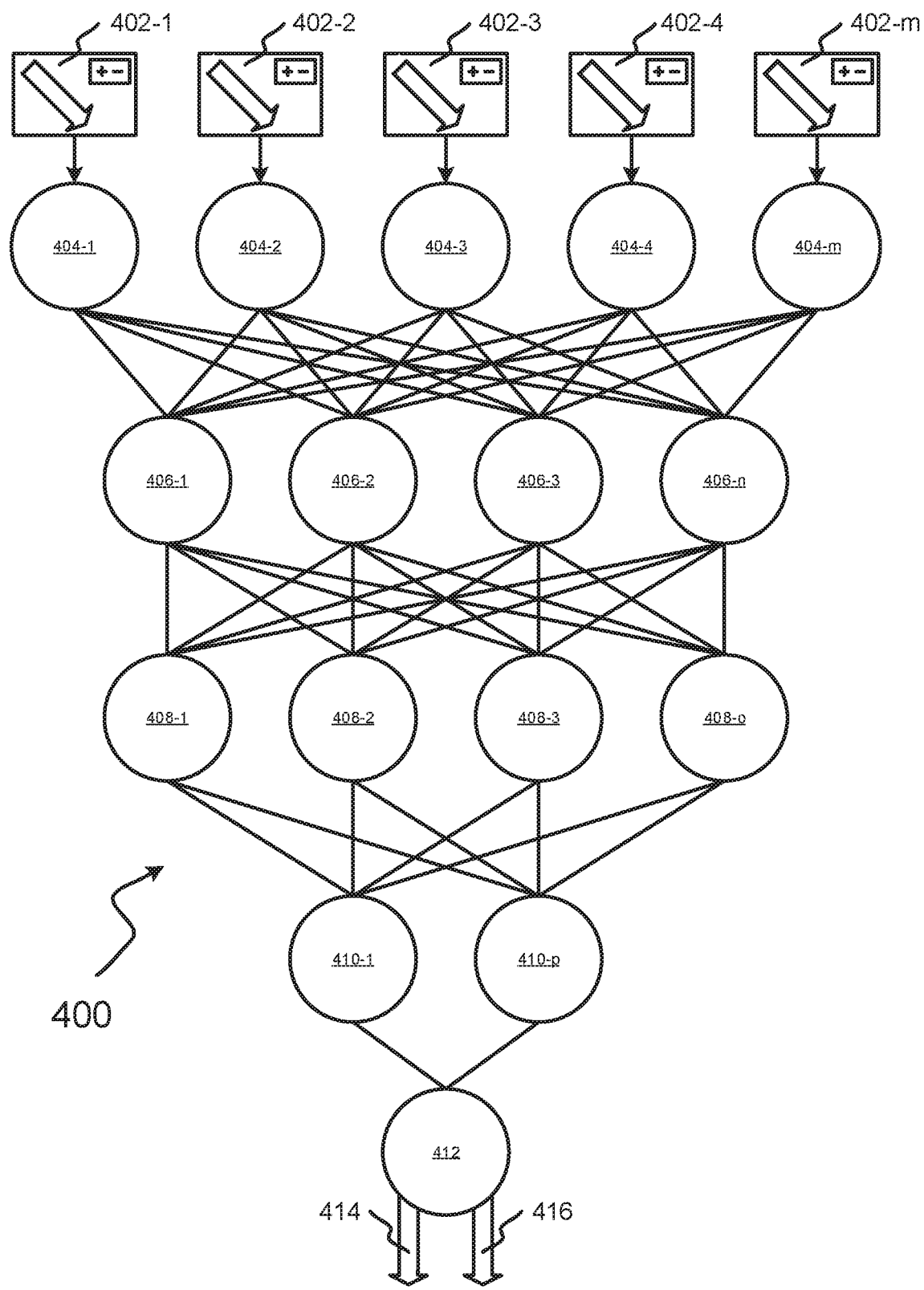
FIG. 4 illustrates an example neural network that can be specialized to process a set of inputs to arrive at a cognitively generated user classification model, in accordance with embodiments of the present disclosure.

FIG. 4 depicts an example neural network that can be specialized to process a set of inputs to arrive at a cognitively generated user classification model, in accordance with embodiments of the present disclosure. Inputs can include, for example, data retrieved/received from a user collaboration environment 110 of FIG. 1. In embodiments, neural network 400 can be a classifier-type neural network. Neural network 400 can be part of a larger neural network. For example, neural network 400 can be nested within a single, larger neural network, connected to several other neural networks, or connected to several other neural networks as part of an overall aggregate neural network.

Inputs 402-1 through 402-$m$ represent the inputs to neural network 400. In this embodiment, 402-1 through 402-$m$ do not represent different inputs. Rather, 402-1 through 402-$m$ represent the same input that is sent to each first-layer neuron (neurons 404-1 through 404-$m$) in neural network 400. In some embodiments, the number of inputs 402-1 through 402-$m$ (i.e., the number represented by m) can equal (and thus be determined by) the number of first-layer neurons in the network. In other embodiments, neural network 400 can incorporate 1 or more bias neurons in the first layer, in which case the number of inputs 402-1 through 402-$m$ can equal the number of first-layer neurons in the network minus the number of first-layer bias neurons. In some embodiments, a single input (e.g., input 402-1) can be input into the neural network. In such an embodiment, the first layer of the neural network can comprise a single neuron, which can propagate the input to the second layer of neurons.

Inputs 402-1 through 402-$m$ can comprise one or more artifact component(s) and a relative composition that is associated with a compositional artifact. For example, inputs 402-1 through 402-$m$ can comprise 10 components with their relative compositions that are associated with a seed artifact. In other embodiments, not all components and their relative compositions can be input into neural network 400. For example, in some embodiments, 30 components can be input into neural network 400, but relative compositions for only 20 components can be input into neural network 400.

Neural network 400 can comprise 5 layers of neurons (referred to as layers 404, 406, 408, 410, and 412, respectively corresponding to illustrated nodes 404-1 to 404-$m$, nodes 406-1 to 406-$n$, nodes 408-1 to 408-$o$, nodes 410-1 to 410-$p$, and node 412). In some embodiments, neural network 400 can have more than 5 layers or fewer than 5 layers. These 5 layers can each be comprised of the same number of neurons as any other layer, more neurons than any other layer, fewer neurons than any other layer, or more neurons than some layers and fewer neurons than other layers. In this embodiment, layer 412 is treated as the output layer. Layer 412 outputs a probability that a target event will occur, and contains only one neuron (neuron 412). In other embodiments, layer 412 can contain more than 1 neuron. In this illustration no bias neurons are shown in neural network 400. However, in some embodiments each layer in neural network 400 can contain one or more bias neurons.

Layers 404-412 can each comprise an activation function. The activation function utilized can be, for example, a rectified linear unit (ReLU) function, a SoftPlus function, a Soft step function, or others. Each layer can use the same activation function, but can also transform the input or output of the layer independently of or dependent upon the ReLU function. For example, layer 404 can be a "dropout" layer, which can process the input of the previous layer (here, the inputs) with some neurons removed from processing. This can help to average the data, and can prevent overspecialization of a neural network to one set of data or several sets of similar data. Dropout layers can also help to prepare the data for "dense" layers. Layer 406, for example, can be a dense layer. In this example, the dense layer can process and reduce the dimensions of the feature vector (e.g., the vector portion of inputs 402-1 through 402-$m$) to eliminate data that is not contributing to the prediction. As a further example, layer 408 can be a "batch normalization" layer. Batch normalization can be used to normalize the outputs of the batch-normalization layer to accelerate learning in the neural network. Layer 410 can be any of a dropout, hidden, or batch-normalization layer. Note that these layers are examples. In other embodiments, any of layers 404 through 410 can be any of dropout, hidden, or batch-normalization layers. This is also true in embodiments with more layers than are illustrated here, or fewer layers.

Layer 412 is the output layer. In this embodiment, neuron 412 produces outputs 414 and 416. Outputs 414 and 416 represent complementary probabilities that a target event will or will not occur. For example, output 414 can represent the probability that a target event will occur, and output 416 can represent the probability that a target event will not occur. In some embodiments, outputs 414 and 416 can each be between 0.0 and 1.0, and can add up to 1.0. In such embodiments, a probability of 1.0 can represent a projected absolute certainty (e.g., if output 414 were 1.0, the projected chance that the target event would occur would be 100%, whereas if output 416 were 1.0, the projected chance that the target event would not occur would be 100%).

FIG. 4 illustrates an example probability-generator neural network with one pattern-recognizer pathway (e.g., a pathway of neurons that processes one set of inputs and analyzes those inputs based on recognized patterns, and produces one set of outputs. However, some embodiments can incorporate a probability-generator neural network that can comprise multiple pattern-recognizer pathways and multiple sets of inputs. In some of these embodiments, the multiple pattern-recognizer pathways can be separate throughout the first several layers of neurons, but can merge with another pattern-recognizer pathway after several layers. In such embodiments, the multiple inputs can merge as well (e.g., several smaller vectors can merge to create one vector). This merger can increase the ability to identify correlations in the patterns identified among different inputs, as well as eliminate data that does not appear to be relevant. In embodiments, neural network 400 can be trained (e.g., biases and weights among nodes can be calibrated) by inputting feedback and/or input from the owner of the cognitive content display device as described herein, and/or by inputting sentiment scores generated from the reaction of a particular visitor, receiving an output from the neural network, and inputting corrections into the neural network to arrive at an expected output. In embodiments, the impact of the feedback and/or visitor reaction on the weights and biases can lessen over time, in order to correct for emotional fluctuations of the owner/visitor(s). In embodiments, the degradation of the impact can be implemented using a half-life (e.g., the impact degrades by 50% for every time interval of X that has passed) or similar model (e.g., a quarter-life, three-quarter-life, etc.).

Figure 5:
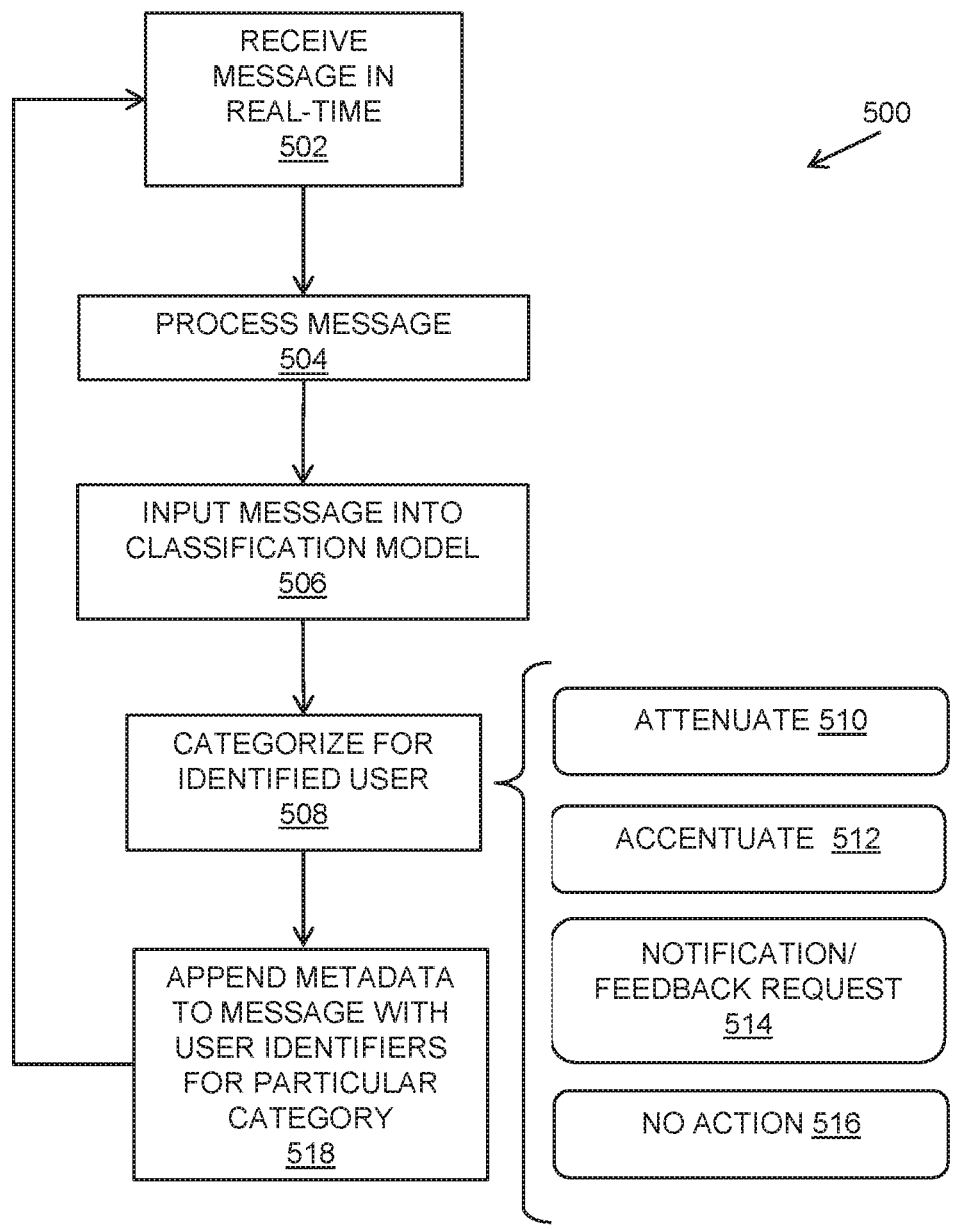
FIG. 5 is a flow diagram illustrating an example method for categorizing a message received in real time based on a classification model, in accordance with embodiments of the present disclosure.

Referring to FIG. 5, shown is a flow diagram illustrating an example method 500 for categorizing, and appending metadata to, a message received in real-time, in accordance with embodiments of the present disclosure.

Method 500 initiates where a message is received in real-time (e.g., as it is input into the collaborative environment by a user). This is illustrated at operation 502. The message can then be processed at operation 504. Processing at operation 504 can include analyzation via a natural language processor (e.g., natural language processing system of 312) to identify topics, cadence, sentiment, etc. In some embodiments, processing at operation 504 can include comparison to other data (e.g., a database or application graph) to identify triggers for particular application actions.

The message is then analyzed using a classification model. This is illustrated at operation 506. The classification model can be built using topics, user information, and application features relating to the current message and user who input the message. The classification model can output a management category for the message/user. This is illustrated at operation 508. The management categories can include: attenuation 510, accentuation 512, a notification or feedback request to the user 514, or no action 516.

Based on the management category assigned to the message and user who entered the message, metadata is appended to the message. This is illustrated at operation 518. Content such as application messages triggered by the message received in real time (e.g., at operation 502) can then be updated with user identifiers (e.g., metadata) for the management category.

Figure 6:
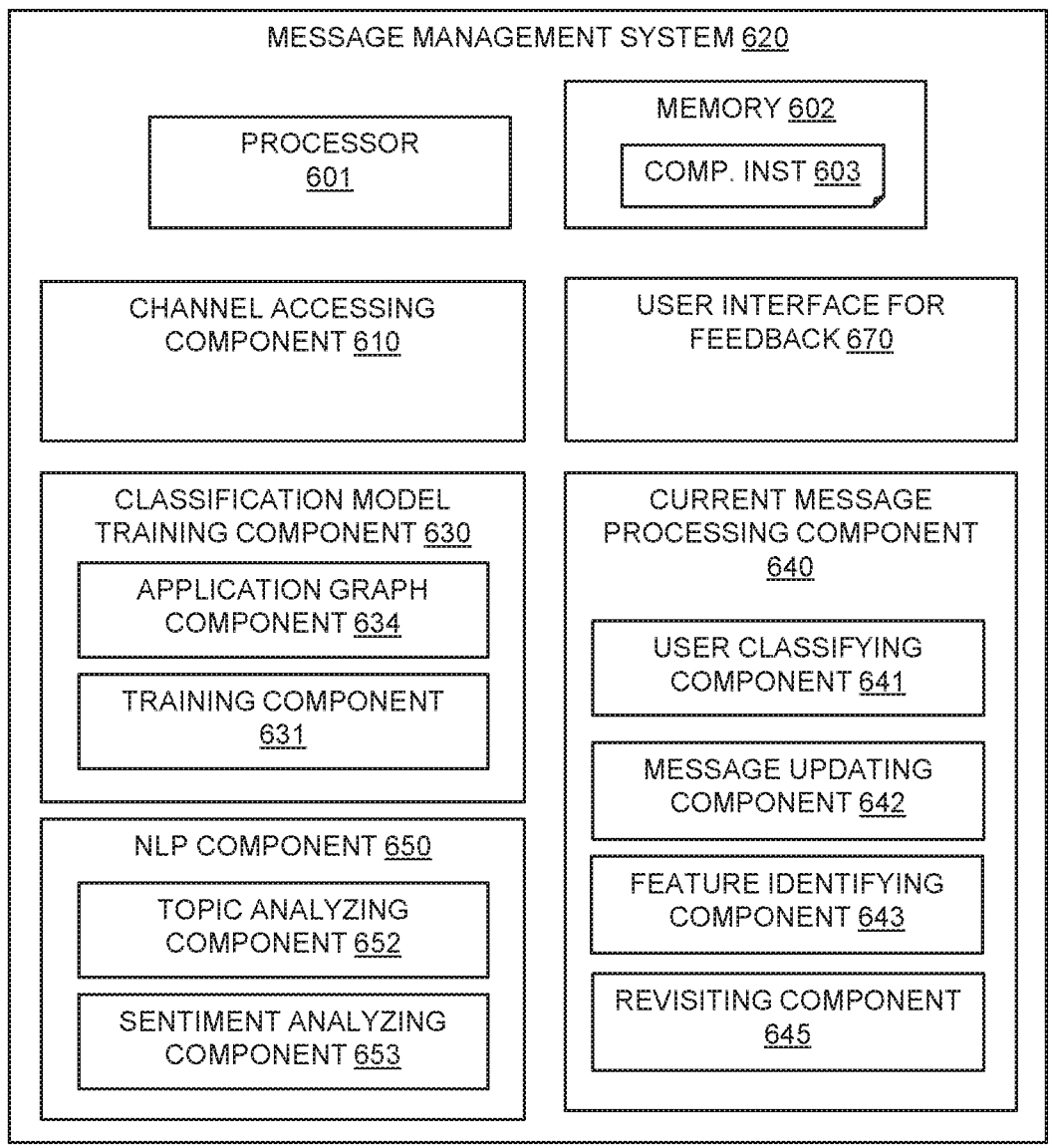
FIG. 6 is a block diagram illustrating a message management system, in accordance with embodiments of the present disclosure.

Referring now to FIG. 6, shown is a block diagram of a message management system 620 (e.g., message management system 140 of FIG. 1), in accordance with embodiments of the present disclosure.

The message management system 620 can include at least one processor 601, a hardware module, or a circuit for executing the functions of the described components which can be software units executing on the at least one processor. Multiple processors running parallel processing threads can be provided enabling parallel processing of some or all of the functions of the components. Memory 602 can be configured to provide computer instructions 603 to the at least one processor 601 to carry out the functionality of the components.

The message attenuation or accentuation system 620 can include a channel accessing component 610 for accessing a group collaboration channel in which messages are displayed from multiple users and in which the channel incorporates one or more applications that provide messages to the channel from application sources.

The message attenuation or accentuation system 620 can include a classification model training component 630 for training a machine learning classification model for the group collaboration channel. The classification model training component 630 is configured learn from a set of features relating to message content, user information, and features of the applications incorporated into the channel and modeling a user classification of a level of interest in an input message. In some embodiments, the classification model can be a neural network as depicted in FIG. 4.

The classification model training component 630 can include an application graph component 634 for building an application graph of the one or more applications incorporated into the channel, wherein the application graph maps an application to application features and messages triggering the features.

The message management system 620 can include a natural language processing component 650 configured to parse collaboration transcripts between users. The natural language processing component can include a topic analyzing component 652 for identifying topics of messages and a sentiment analyzing component 653 for determining a sentiment associated with users/messages regarding particular topics. The data obtained from the NLP component 650 can be used by the classification model training component 630 to train a classification model (e.g., a neural network) via a training component 631. The training component 631 can be configured to train the machine learning classification model with user information (including inferred user information) from analysis of the group collaboration channel and/or user feedback.

The message attenuation or accentuation system 620 can include a user interface 670 associated with the group collaboration channel configured to receive user feedback regarding current message management status (e.g., whether a user accepts/denies particular management classifications (e.g., attenuation/accentuation) for messages/applications).

The classification model training component 630 can analyze ongoing conversations of multiple messages in the group collaboration channel and derive user information for attenuation of messages within the context of the ongoing conversation.

The message attenuation or accentuation system 620 can include a current message processing component 640 for receiving a current message input to the group collaboration channel. The current message processing component can further include a user classifying component 641 for using the machine learning classification model to classify users for which display of messages relating to an application triggered by the current message are to be attenuated or accentuated.

The current message processing component 640 can include a feature identifying component 643 for using an application graph to identify a feature of an application providing the message. The current message processing component 640 can include a message updating component 642 for providing metadata to messages of an application to attenuation/accentuate the messages of the application.

The current message processing component 640 can include a revisiting component 645 for revisiting content in the group collaboration channel after training of the machine learning classification model with user input to reevaluate previous attenuating or accentuating of the display of messages of the content.

Figure 7:
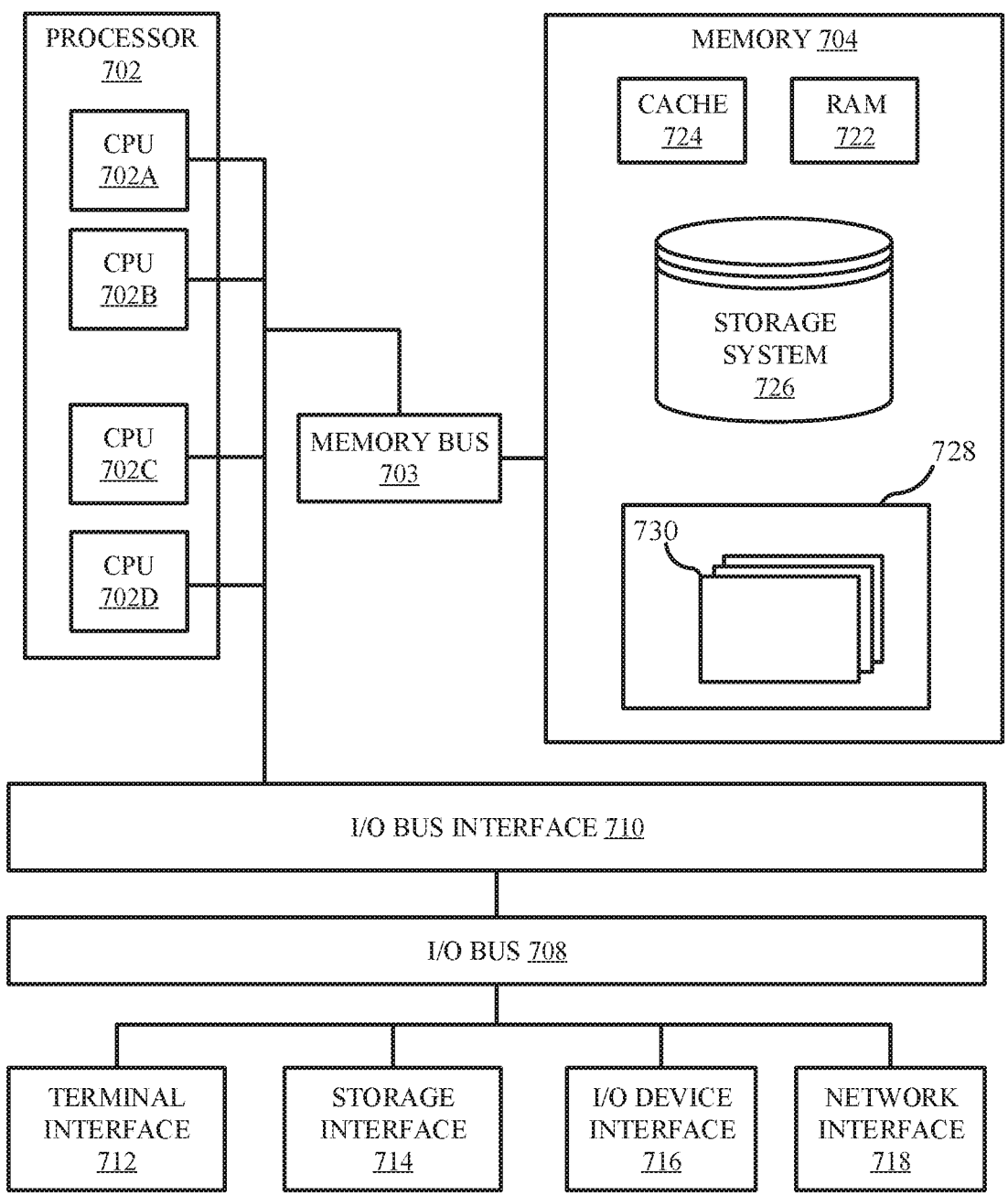
FIG. 7 is a high-level block diagram illustrating an example computer system that can be used in implementing one or more of the methods, tools, and modules, and any related functions, described herein, in accordance with embodiments of the present disclosure.

Referring now to FIG. 7, shown is a high-level block diagram of an example computer system 701 (e.g., message management system 120, natural language processing system 312, message management system 620) that can be used in implementing one or more of the methods, tools, and modules, and any related functions, described herein (e.g., using one or more processor circuits or computer processors of the computer), in accordance with embodiments of the present disclosure. In some embodiments, the major components of the computer system 701 can comprise one or more CPUs 702, a memory subsystem 704, a terminal interface 712, a storage interface 714, an I/O (Input/Output) device interface 716, and a network interface 718, all of which can be communicatively coupled, directly or indirectly, for inter-component communication via a memory bus 703, an I/O bus 708, and an I/O bus interface unit 710.

The computer system 701 can contain one or more general-purpose programmable central processing units (CPUs) 702A, 702B, 702C, and 702D, herein generically referred to as the CPU 702. In some embodiments, the computer system 701 can contain multiple processors typical of a relatively large system; however, in other embodiments the computer system 701 can alternatively be a single CPU system. Each CPU 702 can execute instructions stored in the memory subsystem 704 and can include one or more levels of on-board cache.

System memory 704 can include computer system readable media in the form of volatile memory, such as random access memory (RAM) 722 or cache memory 724. Computer system 701 can further include other removable/non-removable, volatile/non-volatile computer system storage media. By way of example only, storage system 726 can be provided for reading from and writing to a non-removable, non-volatile magnetic media, such as a "hard-drive." Although not shown, a magnetic disk drive for reading from and writing to a removable, non-volatile magnetic disk (e.g., a "USB thumb drive" or "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 can include at least one program product having a set (e.g., at least one) of program modules that are configured to carry out the functions of various embodiments.

One or more programs/utilities 728, each having at least one set of program modules 730 can be stored in memory 704. The programs/utilities 728 can include a hypervisor (also referred to as a virtual machine monitor), one or more operating systems, one or more application programs, other program modules, and program data. Each of the operating systems, one or more application programs, other program modules, and program data or some combination thereof, can include an implementation of a networking environment. Programs/utilities 728 and/or program modules 730 generally perform the functions or methodologies of various embodiments.

In some embodiments, the program modules 730 of the computer system 701 include a message management module. The message management module can be configured to analyze a text transcript from a collaborative environment, generate user classification models based on topics, cadence, sentiment, etc., and manage current/future messages based on the classification models.

Although the memory bus 703 is shown in FIG. 7 as a single bus structure providing a direct communication path among the CPUs 702, the memory subsystem 704, and the I/O bus interface 710, the memory bus 703 can, in some embodiments, include multiple different buses or communication paths, which can be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 can, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices can be connected directly to one or more system I/O buses.

In some embodiments, the computer system 701 can be a multi-user mainframe computer system, a single-user system, or a server computer or similar device that has little or no direct user interface, but receives requests from other computer systems (clients). Further, in some embodiments, the computer system 701 can be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components can have greater or lesser complexity than as represented in FIG. 7, components other than or in addition to those shown in FIG. 7 can be present, and the number, type, and configuration of such components can vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
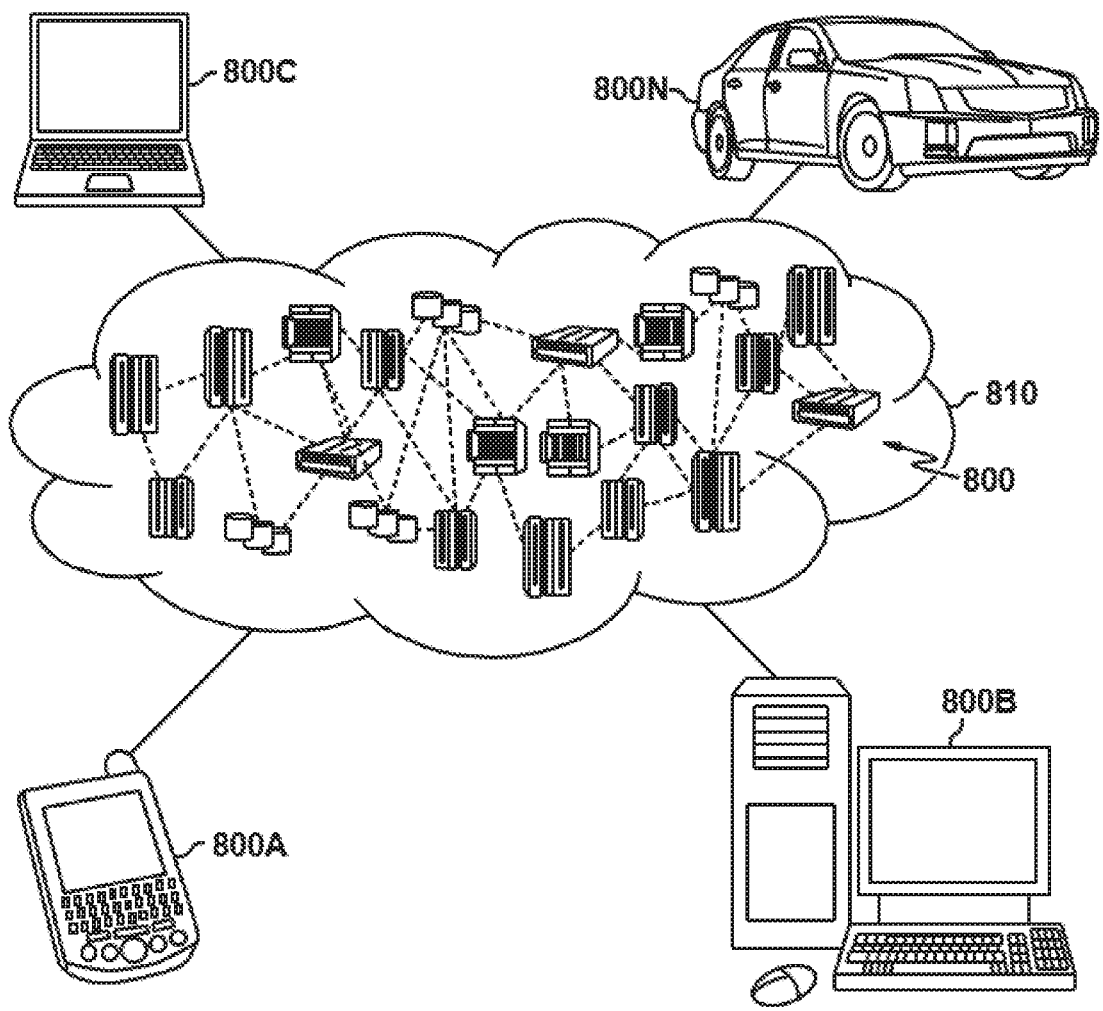
FIG. 8 is a diagram illustrating a cloud computing environment, in accordance with embodiments of the present disclosure.

Referring now to FIG. 8, illustrative cloud computing environment 810 is depicted. As shown, cloud computing environment 810 includes one or more cloud computing nodes 800 with which local computing devices used by cloud consumers, such as, for example, personal digital assistant (PDA) or cellular telephone 800A, desktop computer 800B (e.g., message management system 120, natural language processing system 312, message management system 620) laptop computer 800C (e.g., message management system 120, natural language processing system 312, message management system 620), and/or automobile computer system 800N can communicate. Nodes 800 can communicate with one another. They can be grouped (not shown) physically or virtually, in one or more networks, such as Private, Community, Public, or Hybrid clouds as described hereinabove, or a combination thereof. This allows cloud computing environment 810 to offer infrastructure, platforms and/or software as services for which a cloud consumer does not need to maintain resources on a local computing device. It is understood that the types of computing devices 800A-N shown in FIG. 8 are intended to be illustrative only and that computing nodes 800 and cloud computing environment 810 can communicate with any type of computerized device over any type of network and/or network addressable connection (e.g., using a web browser).

Figure 9:
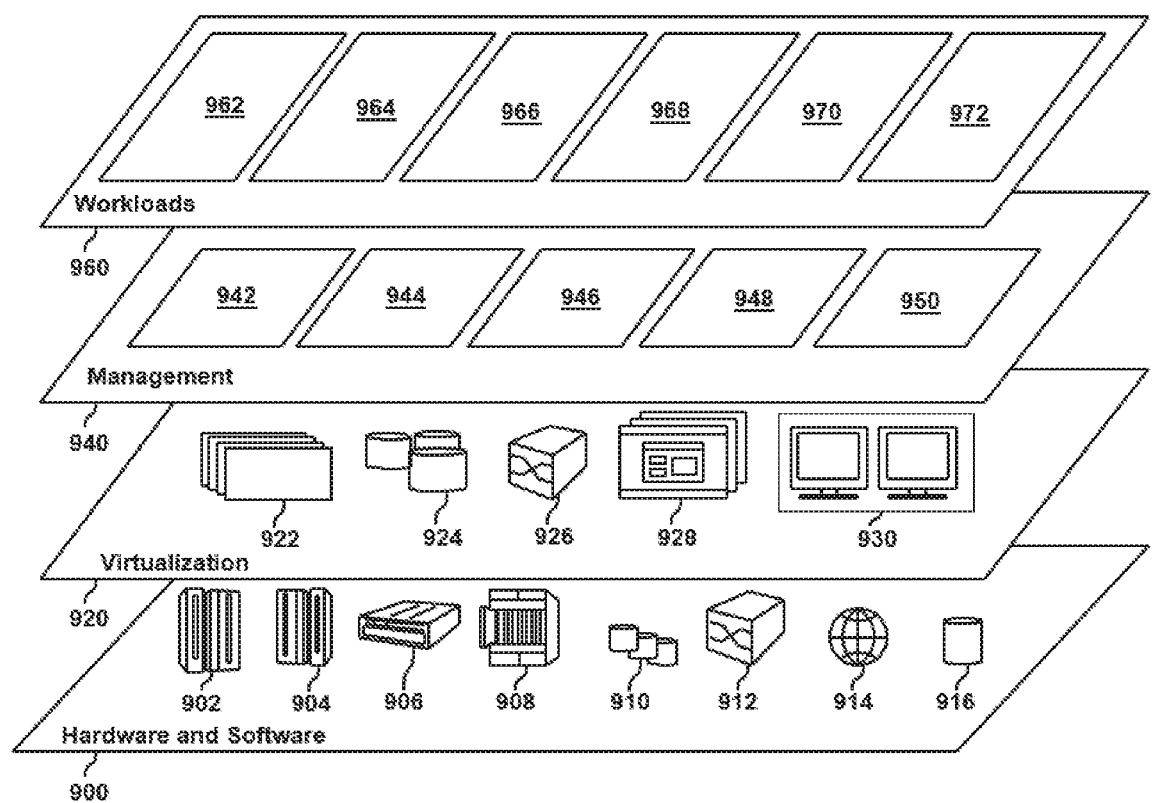
FIG. 9 is a block diagram illustrating abstraction model layers, in accordance with embodiments of the present disclosure.

Referring now to FIG. 9, a set of functional abstraction layers provided by cloud computing environment 810 (FIG. 8) is shown. It should be understood in advance that the components, layers, and functions shown in FIG. 9 are intended to be illustrative only and embodiments of the disclosure are not limited thereto. As depicted below, the following layers and corresponding functions are provided.

Hardware and software layer 900 includes hardware and software components. Examples of hardware components include: mainframes 902; RISC (Reduced Instruction Set Computer) architecture based servers 904; servers 906; blade servers 908; storage devices 910; and networks and networking components 912. In some embodiments, software components include network application server software 914 and database software 916.

Virtualization layer 920 provides an abstraction layer from which the following examples of virtual entities can be provided: virtual servers 922; virtual storage 924; virtual networks 926, including virtual private networks; virtual applications and operating systems 928; and virtual clients 930.

In one example, management layer 940 can provide the functions described below. Resource provisioning 942 provides dynamic procurement of computing resources and other resources that are utilized to perform tasks within the cloud computing environment. For example, resource provisioning 942 can allocate additional computing resources to devices which are indicated to have high activity. Metering and Pricing 944 provide cost tracking as resources are utilized within the cloud computing environment, and billing or invoicing for consumption of these resources. In one example, these resources can include application software licenses. In some embodiments, Metering and Pricing 944 indicates the number of allotted licenses to machines (e.g., message management system 120, natural language processing system 312, message management system 620) in the system. Security provides identity verification for cloud consumers and tasks, as well as protection for data and other resources. User portal 946 provides access to the cloud computing environment for consumers and system administrators. Service level management 948 provides cloud computing resource allocation and management such that required service levels are met. Service Level Agreement (SLA) planning and fulfillment 950 provide pre-arrangement for, and procurement of, cloud computing resources for which a future requirement is anticipated in accordance with an SLA.

Workloads layer 960 provides examples of functionality for which the cloud computing environment can be utilized. Examples of workloads and functions which can be provided from this layer include: mapping and navigation 962; software development and lifecycle management 964; virtual classroom education delivery 966; data analytics processing 968; transaction processing 970; and identifying an identifiable media 972.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method for managing messages in a user collaboration environment, comprising:
    accessing a group collaboration channel in which messages are displayed from multiple users, wherein the group collaboration channel includes an application that provides application messages to the channel;
    analyzing, using a natural language processor having a tokenizer, part of speech (POS) tagger, a semantic relationship identifier, and a syntactic relationship identifier, a transcript of the group collaboration channel to determine a set of topics a user has discussed;
    building an application graph that maps the application, the application features, and the application messages for the channel;
    associating the application messages with the application features using the application graph;
    selecting, using a burst/reflection analysis, a subset of topics of the set of topics and determining, by the natural language processor, a user sentiment of each topic of the subset of topics;
    training, based on the subset of topics, the application graph, and the user sentiment of each topic of the subset of topics, a neural network classification model for the user;
    receiving a current message at the group collaboration channel from the application, the current message containing current message content;
    determining, prior to displaying the current message at the group collaboration channel, a management category for the current message for the user based on the neural network classification model for the user and the current message content;
    after determining the management category for the message:
    tagging the management category as metadata on the current message from the application;
    parsing the metadata of the management category and selectively displaying the current message from the application based on the applied management category; and
    updating the neural network classification model using the current message, and in response:
    re-evaluating the applied management category for one or more past messages in the group collaboration channel; and
    selectively displaying the one or more past messages based on the re-evaluated applied management category.

2. The method of claim 1, wherein the user sentiment regarding each topic is determined by generating a sentiment score for the user and comparing the sentiment score to a sentiment threshold.

3. The method of claim 2, wherein the user sentiment is determined to be positive in response to the sentiment score exceeding the sentiment threshold, the positive sentiment score resulting in the management category being accentuation.

4. The method of claim 1, further comprising:
    receiving a plurality of messages at the group collaboration channel from a plurality of applications;
    selectively deemphasizing one of the plurality of messages in the group collaboration channel based on the applied management category;
    selectively emphasizing one of the plurality of messages in the group collaboration channel based on the applied management category;
    selectively notifying the user about one of the plurality of messages in the group collaboration channel based on the applied management category; and
    selectively requesting feedback from the user in response to one of the plurality of messages in the group collaboration channel based on the applied management category.

5. The method of claim 1, wherein the message from the application triggers a feature which displays a set of content, wherein the set of content triggered by the feature is managed according to the management category.

6. The method of claim 1, wherein a first user sentiment is updated based on future messages, wherein the neural network classification model is updated based on the updated first user sentiment.

7. The method of claim 1, wherein in response to a determination that a time stamp range for a first topic of the set of topics exceeds a time stamp range threshold, the first topic is selected.

8. A system for managing messages in a user collaboration environment, comprising:
    a memory component; and
    at least one processor, wherein the processor is configured to perform a method comprising:
        accessing a group collaboration channel in which messages are displayed from multiple users, wherein the group collaboration channel includes an application that provides application messages to the channel;
        analyzing, using a natural language processor having a tokenizer, part of speech (POS) tagger, a semantic relationship identifier, and a syntactic relationship identifier, a transcript of the group collaboration channel to determine a set of topics a user has discussed;
        building an application graph that maps the application, the application features, and the application messages for the channel;
        associating the application messages with the application features using the application graph;
        selecting, using a burst/reflection analysis, a subset of topics of the set of topics and determining, by the natural language processor, a user sentiment of each topic of the subset of topics;
        training, based on the subset of topics, the application graph, and the user sentiment of each topic of the subset of topics, a neural network classification model for the user;
        receiving a current message at the group collaboration channel from the application, the current message containing current message content;
        determining, prior to displaying the current message at the group collaboration channel, a management category for the current message for the user based on the neural network classification model for the user and the current message content;
        after determining the management category for the message:
            tagging the management category as metadata on the current message from the application;
            parsing the metadata of the management category and selectively displaying the current message from the application based on the applied management category; and
            updating the neural network classification model using the current message, and in response:
                re-evaluating the applied management category for one or more past messages in the group collaboration channel; and
                selectively displaying the one or more past messages based on the re-evaluated applied management category.

9. The system of claim 8, wherein the user sentiment regarding each topic is determined by generating a sentiment score for the user and comparing the sentiment score to a sentiment threshold.

10. The system of claim 9, wherein the user sentiment is determined to be negative in response to the sentiment score falling below the sentiment threshold, the negative sentiment score resulting in the management category being attenuation.

11. The system of claim 8, wherein the method further comprises:
    receiving a plurality of messages at the group collaboration channel from a plurality of applications;
    selectively suppressing one of the plurality of messages in the group collaboration channel based on the applied management category;
    selectively emphasizing one of the plurality of messages in the group collaboration channel based on the applied management category;
    selectively notifying the user about one of the plurality of messages in the group collaboration channel based on the applied management category; and
    selectively requesting feedback from the user in response to one of the plurality of messages in the group collaboration channel based on the applied management category.

12. The system of claim 8, wherein the message from the application triggers a feature which displays a set of content, wherein the set of content triggered by the feature is managed according to the management category.

13. The system of claim 8, wherein a first user sentiment is updated based on future messages, wherein the machine learning classification model is updated based on the updated first user sentiment.

14. The system of claim 8, wherein in response to a determination that a time stamp range for a first topic of the set of topics exceeds a time stamp range threshold, the first topic is selected.

15. A computer program product for managing messages in a user collaboration environment, the computer program product comprising a non-transitory computer readable storage medium having program instructions embodied therewith, the program instructions executable by a processor to cause the processor to perform a method comprising:
    accessing a group collaboration channel in which messages are displayed from multiple users, wherein the group collaboration channel includes an application that provides application messages to the channel;
    analyzing, using a natural language processor having a tokenizer, part of speech (POS) tagger, a semantic relationship identifier, and a syntactic relationship identifier, a transcript of the group collaboration channel to determine a set of topics a user has discussed;
    building an application graph that maps the applications, the application features, and the application messages for the channel;
    associating the application messages with the application features using the application graph;
    selecting, using a burst/reflection analysis, a subset of topics of the set of topics and determining, by the natural language processor, a user sentiment of each topic of the subset of topics;
    training, based on the subset of topics, the application graph, and the user sentiment of each topic of the subset of topics, a neural network classification model for the user;
    receiving a current message at the group collaboration channel from the application, the current message containing current message content;
    determining, prior to displaying the current message at the group collaboration channel, a management category for the current message for the user based on the neural network classification model for the user and the current message content;
    after determining the management category for the message:
        tagging the management category as metadata on the current message from the application;

parsing the metadata of the management category and selectively displaying the current message from the application based on the applied management category; and updating the neural network classification model using the current message, and in response:

re-evaluating the applied management category for one or more past messages in the group collaboration channel; and selectively displaying the one or more past messages based on the re-evaluated applied management category.

\* \* \* \* \*